United States Patent
Bainbridge et al.

(10) Patent No.: US 10,469,337 B2
(45) Date of Patent: *Nov. 5, 2019

(54) COST MANAGEMENT AGAINST REQUIREMENTS FOR THE GENERATION OF A NOC

(71) Applicant: NetSpeed Systems, Inc., San Jose, CA (US)

(72) Inventors: William John Bainbridge, San Jose, CA (US); Eric Norige, San Jose, CA (US); Sailesh Kumar, San Jose, CA (US); Nishant Rao, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/885,297

(22) Filed: Jan. 31, 2018

(65) Prior Publication Data

US 2018/0219738 A1    Aug. 2, 2018

Related U.S. Application Data

(60) Provisional application No. 62/453,431, filed on Feb. 1, 2017.

(51) Int. Cl.
*H04L 12/24* (2006.01)
*G06F 15/78* (2006.01)
(Continued)

(52) U.S. Cl.
CPC ...... *H04L 41/5009* (2013.01); *G06F 15/7825* (2013.01); *G06F 17/50* (2013.01);
(Continued)

(58) Field of Classification Search
CPC . H04L 41/5009; H04L 41/12; H04L 41/0826; H04L 45/121; H04L 45/126;
(Continued)

(56) References Cited

U.S. PATENT DOCUMENTS

| | | | |
|---|---|---|---|
| 4,409,838 A | 10/1983 | Schomberg | |
| 4,933,933 A | 6/1990 | Daily et al. | |

(Continued)

FOREIGN PATENT DOCUMENTS

| | | |
|---|---|---|
| CN | 103684961 A | 3/2014 |
| JP | 5936793 | 5/2016 |

(Continued)

OTHER PUBLICATIONS

Ababei, C., et al., Achieving Network on Chip Fault Tolerance by Adaptive Remapping, Parallel & Distributed Processing, 2009, IEEE International Symposium, 4 pgs.

(Continued)

*Primary Examiner* — Kibrom T Hailu
(74) *Attorney, Agent, or Firm* — Spectrum IP Law Group LLC

(57) ABSTRACT

Example implementations as described herein are directed to systems and methods for processing a NoC specification for a plurality of performance requirements of a NoC, and generating a plurality of NoCs, each of the plurality of NoCs meeting a first subset of the plurality of performance requirements. For each of the plurality of NoCs, the example implementations involve presenting a difference between an actual performance of the each of the plurality of NoCs and each performance requirement of a second subset of the plurality of performance requirements and one or more costs for each of the plurality of NoCs.

20 Claims, 13 Drawing Sheets

(51) Int. Cl.
*G06N 20/00* (2019.01)
*H04L 12/721* (2013.01)
*H04L 12/729* (2013.01)
*G06F 17/50* (2006.01)

(52) U.S. Cl.
CPC ......... *G06F 17/5068* (2013.01); *G06N 20/00* (2019.01); *H04L 41/083* (2013.01); *H04L 41/0826* (2013.01); *H04L 41/0833* (2013.01); *H04L 41/12* (2013.01); *H04L 41/145* (2013.01); *H04L 41/16* (2013.01); *H04L 45/124* (2013.01); *H04L 45/125* (2013.01)

(58) Field of Classification Search
CPC . H04L 41/083; H04L 41/0833; H04L 41/145; H04L 41/16; H04L 45/124; H04L 45/125; G06N 20/00; G06F 15/18; G06F 15/7825; G06F 17/50; G06F 17/5068
See application file for complete search history.

(56) References Cited

U.S. PATENT DOCUMENTS

| | | |
|---|---|---|
| 5,105,424 A | 4/1992 | Flaig et al. |
| 5,163,016 A | 11/1992 | Har'El et al. |
| 5,355,455 A | 10/1994 | Hilgendorf et al. |
| 5,432,785 A | 7/1995 | Ahmed et al. |
| 5,563,003 A | 10/1996 | Suzuki et al. |
| 5,583,990 A | 12/1996 | Birrittella et al. |
| 5,588,152 A | 12/1996 | Dapp et al. |
| 5,764,740 A | 6/1998 | Holender |
| 5,790,554 A | 8/1998 | Pitcher |
| 5,859,981 A | 1/1999 | Levin et al. |
| 5,991,308 A | 11/1999 | Fuhrmann et al. |
| 5,999,530 A | 12/1999 | LeMaire |
| 6,003,029 A | 12/1999 | Agrawal et al. |
| 6,029,220 A | 2/2000 | Iwamura et al. |
| 6,058,385 A | 5/2000 | Koza et al. |
| 6,101,181 A | 8/2000 | Passint et al. |
| 6,108,739 A | 8/2000 | James et al. |
| 6,249,902 B1 | 6/2001 | Igusa et al. |
| 6,314,487 B1 | 11/2001 | Hahn et al. |
| 6,377,543 B1 | 4/2002 | Grover |
| 6,415,282 B1 | 7/2002 | Mukherjea et al. |
| 6,674,720 B1 | 1/2004 | Passint et al. |
| 6,701,361 B1 | 3/2004 | Meier |
| 6,711,717 B2 | 3/2004 | Nystrom et al. |
| 6,778,531 B1 | 8/2004 | Kodialam |
| 6,925,627 B1 | 8/2005 | Longway et al. |
| 6,967,926 B1 | 11/2005 | Williams, Jr. et al. |
| 6,983,461 B2 | 1/2006 | Hutchison et al. |
| 7,046,633 B2 | 5/2006 | Carvey |
| 7,065,730 B2 | 6/2006 | Alpert et al. |
| 7,143,221 B2 | 11/2006 | Bruce et al. |
| 7,318,214 B1 | 1/2008 | Prasad et al. |
| 7,379,424 B1 | 5/2008 | Krueger |
| 7,437,518 B2 | 10/2008 | Tsien |
| 7,461,236 B1 | 12/2008 | Wentzlaff |
| 7,509,619 B1 | 3/2009 | Miller et al. |
| 7,564,865 B2 | 7/2009 | Radulescu |
| 7,583,602 B2 | 9/2009 | Bejerano |
| 7,590,959 B2 | 9/2009 | Tanaka |
| 7,693,064 B2 | 4/2010 | Thubert et al. |
| 7,701,252 B1 | 4/2010 | Chow et al. |
| 7,724,735 B2 | 5/2010 | Locatelli et al. |
| 7,725,859 B1 | 5/2010 | Lenahan et al. |
| 7,774,783 B2 | 8/2010 | Toader |
| 7,808,968 B1 | 10/2010 | Kalmanek, Jr. et al. |
| 7,853,774 B1 | 12/2010 | Wentzlaff |
| 7,917,885 B2 | 3/2011 | Becker |
| 7,957,381 B2 | 6/2011 | Clermidy et al. |
| 7,973,804 B2 | 7/2011 | Mejdrich et al. |
| 7,995,599 B2 | 8/2011 | Angiolini et al. |
| 8,018,249 B2 | 9/2011 | Koch et al. |
| 8,020,163 B2 | 9/2011 | Nollet et al. |
| 8,020,168 B2 | 9/2011 | Hoover et al. |
| 8,050,256 B1 | 11/2011 | Bao et al. |
| 8,059,551 B2 | 11/2011 | Milliken |
| 8,098,677 B1 | 1/2012 | Pleshek |
| 8,099,757 B2 | 1/2012 | Riedl et al. |
| 8,136,071 B2 | 3/2012 | Solomon |
| 8,203,938 B2 | 6/2012 | Gibbings |
| 8,261,025 B2 | 9/2012 | Mejdrich et al. |
| 8,281,297 B2 | 10/2012 | Dasu et al. |
| 8,306,042 B1 | 11/2012 | Abts |
| 8,312,402 B1 | 11/2012 | Okhmatovski et al. |
| 8,352,774 B2 | 1/2013 | Elrabaa |
| 8,407,425 B2 | 3/2013 | Gueron et al. |
| 8,412,795 B2 | 4/2013 | Mangano et al. |
| 8,438,578 B2 | 5/2013 | Hoover et al. |
| 8,448,102 B2 | 5/2013 | Kornachuk et al. |
| 8,490,110 B2 | 7/2013 | Hoover et al. |
| 8,492,886 B2 | 7/2013 | Or-Bach et al. |
| 8,503,445 B2 | 8/2013 | Lo |
| 8,514,889 B2 | 8/2013 | Jayasimha |
| 8,541,819 B1 | 9/2013 | Or-Bach et al. |
| 8,543,964 B2 | 9/2013 | Ge et al. |
| 8,572,353 B1 | 10/2013 | Bratt |
| 8,601,423 B1 | 12/2013 | Philip et al. |
| 8,614,955 B2 | 12/2013 | Gintis |
| 8,619,622 B2 | 12/2013 | Harrand et al. |
| 8,635,577 B2 | 1/2014 | Kazda et al. |
| 8,661,455 B2 | 2/2014 | Mejdrich et al. |
| 8,667,439 B1 | 3/2014 | Kumar et al. |
| 8,705,368 B1 | 4/2014 | Abts et al. |
| 8,711,867 B2 | 4/2014 | Guo et al. |
| 8,717,875 B2 | 5/2014 | Bejerano et al. |
| 8,726,295 B2 | 5/2014 | Hoover et al. |
| 8,738,860 B1 | 5/2014 | Griffin et al. |
| 8,793,644 B2 | 7/2014 | Michel et al. |
| 8,798,038 B2 | 8/2014 | Jayasimha et al. |
| 8,819,611 B2 | 8/2014 | Philip et al. |
| 8,885,510 B2 | 11/2014 | Kumar et al. |
| 9,210,048 B1 | 12/2015 | Marr |
| 9,223,711 B2 | 12/2015 | Philip et al. |
| 9,225,665 B2 | 12/2015 | Boucard et al. |
| 9,244,845 B2 | 1/2016 | Rowlands et al. |
| 9,244,880 B2 | 1/2016 | Philip et al. |
| 9,253,085 B2 | 2/2016 | Kumar et al. |
| 9,294,354 B2 | 3/2016 | Kumar |
| 9,319,232 B2 | 4/2016 | Kumar |
| 9,444,702 B1 | 9/2016 | Raponi et al. |
| 9,471,726 B2 | 10/2016 | Kumar et al. |
| 9,473,359 B2 | 10/2016 | Kumar et al. |
| 9,473,388 B2 | 10/2016 | Kumar et al. |
| 9,473,415 B2 | 10/2016 | Kumar |
| 9,477,280 B1 | 10/2016 | Gangwar et al. |
| 9,529,400 B1 | 12/2016 | Kumar et al. |
| 9,535,848 B2 | 1/2017 | Rowlands et al. |
| 9,568,970 B1 | 2/2017 | Kaushal et al. |
| 9,569,579 B1 | 2/2017 | Kumar |
| 9,571,341 B1 | 2/2017 | Kumar et al. |
| 9,571,402 B2 | 2/2017 | Kumar et al. |
| 9,571,420 B2 | 2/2017 | Kumar |
| 9,590,813 B1 | 3/2017 | Kumar et al. |
| 9,660,942 B2 | 5/2017 | Kumar |
| 9,699,079 B2 | 7/2017 | Chopra et al. |
| 9,742,630 B2 | 8/2017 | Philip et al. |
| 9,979,668 B2 * | 5/2018 | Chen .................... H04L 47/625 |
| 2002/0071392 A1 | 6/2002 | Grover et al. |
| 2002/0073380 A1 | 6/2002 | Cooke et al. |
| 2002/0083159 A1 | 6/2002 | Ward et al. |
| 2002/0095430 A1 | 7/2002 | Egilsson et al. |
| 2002/0150094 A1 | 10/2002 | Cheng |
| 2003/0005149 A1 | 1/2003 | Haas |
| 2003/0088602 A1 | 5/2003 | Dutta et al. |
| 2003/0145314 A1 | 7/2003 | Nguyen et al. |
| 2003/0200315 A1 | 10/2003 | Goldenberg |
| 2004/0006584 A1 | 1/2004 | Vandeweerd |
| 2004/0019814 A1 | 1/2004 | Pappalardo |
| 2004/0049565 A1 | 3/2004 | Keller et al. |
| 2004/0103218 A1 | 5/2004 | Blumrich et al. |
| 2004/0156376 A1 | 8/2004 | Nakagawa |
| 2004/0156383 A1 | 8/2004 | Nakagawa |

(56) References Cited

U.S. PATENT DOCUMENTS

| | | |
|---|---|---|
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2005/0228930 A1 | 10/2005 | Ning et al. |
| 2005/0286543 A1 | 12/2005 | Coppola et al. |
| 2006/0002303 A1 | 1/2006 | Bejerano |
| 2006/0031615 A1 | 2/2006 | Bruce et al. |
| 2006/0053312 A1 | 3/2006 | Jones |
| 2006/0075169 A1 | 4/2006 | Harris et al. |
| 2006/0104274 A1 | 5/2006 | Caviglia |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0189283 A1 | 8/2007 | Agarwal et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0127014 A1 | 5/2008 | Pandey |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0067331 A1 | 3/2009 | Watsen |
| 2009/0067348 A1 | 3/2009 | Vasseur |
| 2009/0070726 A1 | 3/2009 | Mehrotra et al. |
| 2009/0083263 A1 | 3/2009 | Felch |
| 2009/0089725 A1 | 4/2009 | Khan |
| 2009/0109996 A1 | 4/2009 | Hoover |
| 2009/0122703 A1 | 5/2009 | Gangwal et al. |
| 2009/0125574 A1 | 5/2009 | Mejdrich |
| 2009/0125703 A1 | 5/2009 | Mejdrich |
| 2009/0125706 A1 | 5/2009 | Hoover |
| 2009/0135739 A1 | 5/2009 | Hoover |
| 2009/0138567 A1 | 5/2009 | Hoover |
| 2009/0150647 A1 | 6/2009 | Mejdrich |
| 2009/0157976 A1 | 6/2009 | Comparan |
| 2009/0172304 A1 | 7/2009 | Gueron et al. |
| 2009/0182944 A1 | 7/2009 | Comparan |
| 2009/0182954 A1 | 7/2009 | Mejdrich |
| 2009/0182986 A1 | 7/2009 | Schwinn |
| 2009/0182987 A1 | 7/2009 | Mejdrich |
| 2009/0187716 A1 | 7/2009 | Comparan et al. |
| 2009/0187734 A1 | 7/2009 | Mejdrich |
| 2009/0187756 A1 | 7/2009 | Nollet et al. |
| 2009/0201302 A1 | 8/2009 | Hoover |
| 2009/0210184 A1 | 8/2009 | Medardoni et al. |
| 2009/0210883 A1 | 8/2009 | Hoover |
| 2009/0228681 A1 | 9/2009 | Mejdrich |
| 2009/0228682 A1 | 9/2009 | Mejdrich |
| 2009/0228689 A1 | 9/2009 | Muff |
| 2009/0228690 A1 | 9/2009 | Muff |
| 2009/0231348 A1 | 9/2009 | Mejdrich et al. |
| 2009/0231349 A1 | 9/2009 | Mejdrich |
| 2009/0240920 A1 | 9/2009 | Muff |
| 2009/0245257 A1 | 10/2009 | Comparan |
| 2009/0256836 A1 | 10/2009 | Fowler |
| 2009/0260013 A1 | 10/2009 | Heil |
| 2009/0268677 A1 | 10/2009 | Chou et al. |
| 2009/0271172 A1 | 10/2009 | Mejdrich |
| 2009/0276572 A1 | 11/2009 | Heil |
| 2009/0282139 A1 | 11/2009 | Mejdrich |
| 2009/0282197 A1 | 11/2009 | Comparan |
| 2009/0282211 A1 | 11/2009 | Hoover |
| 2009/0282214 A1 | 11/2009 | Kuesel |
| 2009/0282221 A1 | 11/2009 | Heil |
| 2009/0282222 A1 | 11/2009 | Hoover |
| 2009/0282226 A1 | 11/2009 | Hoover |
| 2009/0282227 A1 | 11/2009 | Hoover |
| 2009/0282419 A1 | 11/2009 | Mejdrich |
| 2009/0285222 A1 | 11/2009 | Hoover et al. |
| 2009/0287885 A1 | 11/2009 | Kriegel |
| 2009/0292907 A1 | 11/2009 | Schwinn |
| 2009/0293061 A1 | 11/2009 | Schwinn |
| 2009/0300292 A1 | 12/2009 | Fang et al. |
| 2009/0300335 A1 | 12/2009 | Muff |
| 2009/0307714 A1 | 12/2009 | Hoover et al. |
| 2009/0313592 A1 | 12/2009 | Murali et al. |
| 2009/0315908 A1 | 12/2009 | Comparan |
| 2010/0023568 A1 | 1/2010 | Hickey |
| 2010/0031009 A1 | 2/2010 | Muff |
| 2010/0040162 A1 | 2/2010 | Suehiro |
| 2010/0042812 A1 | 2/2010 | Hickey |
| 2010/0042813 A1 | 2/2010 | Hickey |
| 2010/0070714 A1 | 3/2010 | Hoover |
| 2010/0091787 A1 | 4/2010 | Muff |
| 2010/0100707 A1 | 4/2010 | Mejdrich |
| 2010/0100712 A1 | 4/2010 | Mejdrich |
| 2010/0100770 A1 | 4/2010 | Mejdrich |
| 2010/0100934 A1 | 4/2010 | Mejdrich |
| 2010/0106940 A1 | 4/2010 | Muff |
| 2010/0125722 A1 | 5/2010 | Hickey |
| 2010/0158005 A1 | 6/2010 | Mukhopadhyay et al. |
| 2010/0162019 A1 | 6/2010 | Kumar |
| 2010/0189111 A1 | 7/2010 | Muff |
| 2010/0191940 A1 | 7/2010 | Mejdrich |
| 2010/0211718 A1 | 8/2010 | Gratz et al. |
| 2010/0223505 A1 | 9/2010 | Andreev et al. |
| 2010/0228781 A1 | 9/2010 | Fowler |
| 2010/0239185 A1 | 9/2010 | Fowler |
| 2010/0239186 A1 | 9/2010 | Fowler |
| 2010/0242003 A1 | 9/2010 | Kwok |
| 2010/0269123 A1 | 10/2010 | Mejdrich |
| 2010/0284309 A1 | 11/2010 | Allan |
| 2010/0333099 A1 | 12/2010 | Kupferschmidt |
| 2011/0022754 A1 | 1/2011 | Cidon et al. |
| 2011/0035523 A1 | 2/2011 | Feero et al. |
| 2011/0044336 A1 | 2/2011 | Umeshima |
| 2011/0060831 A1 | 3/2011 | Ishii et al. |
| 2011/0063285 A1 | 3/2011 | Hoover |
| 2011/0064077 A1 | 3/2011 | Wen |
| 2011/0072407 A1 | 3/2011 | Keinert et al. |
| 2011/0085550 A1 | 4/2011 | Lecler et al. |
| 2011/0085561 A1 | 4/2011 | Ahn |
| 2011/0103799 A1 | 5/2011 | Shacham et al. |
| 2011/0119322 A1 | 5/2011 | Li |
| 2011/0154282 A1 | 6/2011 | Chang et al. |
| 2011/0173258 A1 | 7/2011 | Arimilli |
| 2011/0191088 A1 | 8/2011 | Hsu et al. |
| 2011/0191774 A1 | 8/2011 | Hsu et al. |
| 2011/0235531 A1 | 9/2011 | Vangal et al. |
| 2011/0243147 A1 | 10/2011 | Paul |
| 2011/0276937 A1 | 11/2011 | Waller |
| 2011/0289485 A1 | 11/2011 | Mejdrich |
| 2011/0292063 A1 | 12/2011 | Mejdrich |
| 2011/0302345 A1 | 12/2011 | Boucard et al. |
| 2011/0302450 A1 | 12/2011 | Hickey |
| 2011/0307734 A1 | 12/2011 | Boesen et al. |
| 2011/0316864 A1 | 12/2011 | Mejdrich |
| 2011/0320719 A1 | 12/2011 | Mejdrich |
| 2011/0320724 A1 | 12/2011 | Mejdrich |
| 2011/0320771 A1 | 12/2011 | Mejdrich |
| 2011/0320854 A1 | 12/2011 | Elrabaa |
| 2011/0320991 A1 | 12/2011 | Hsu |
| 2011/0321057 A1 | 12/2011 | Mejdrich |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0054511 A1 | 3/2012 | Brinks |
| 2012/0072635 A1 | 3/2012 | Yoshida |
| 2012/0079147 A1 | 3/2012 | Ishii et al. |
| 2012/0099475 A1 | 4/2012 | Tokuoka |
| 2012/0110106 A1 | 5/2012 | De Lescure et al. |

(56) References Cited

U.S. PATENT DOCUMENTS

| | | |
|---|---|---|
| 2012/0110541 A1 | 5/2012 | Ge et al. |
| 2012/0144065 A1 | 6/2012 | Parker |
| 2012/0155250 A1 | 6/2012 | Carney et al. |
| 2012/0173846 A1 | 7/2012 | Wang et al. |
| 2012/0176364 A1 | 7/2012 | Schardt |
| 2012/0195321 A1 | 8/2012 | Ramanujam |
| 2012/0198408 A1 | 8/2012 | Chopra |
| 2012/0209944 A1 | 8/2012 | Mejdrich et al. |
| 2012/0218998 A1 | 8/2012 | Sarikaya |
| 2012/0221711 A1 | 8/2012 | Kuesel |
| 2012/0260252 A1 | 10/2012 | Kuesel |
| 2012/0311512 A1 | 12/2012 | Michel |
| 2013/0021896 A1 | 1/2013 | Pu |
| 2013/0028083 A1 | 1/2013 | Yoshida |
| 2013/0028090 A1 | 1/2013 | Yamaguchi et al. |
| 2013/0028261 A1 | 1/2013 | Lee |
| 2013/0036296 A1 | 2/2013 | Hickey |
| 2013/0044117 A1 | 2/2013 | Mejdrich |
| 2013/0046518 A1 | 2/2013 | Mejdrich |
| 2013/0051397 A1 | 2/2013 | Guo et al. |
| 2013/0054811 A1 | 2/2013 | Harrand |
| 2013/0073771 A1 | 3/2013 | Hanyu |
| 2013/0073878 A1 | 3/2013 | Jayasimha |
| 2013/0080073 A1 | 3/2013 | de Corral |
| 2013/0080671 A1 | 3/2013 | Ishii |
| 2013/0086399 A1 | 4/2013 | Tychon |
| 2013/0103369 A1 | 4/2013 | Huynh et al. |
| 2013/0103912 A1 | 4/2013 | Jones et al. |
| 2013/0111190 A1 | 5/2013 | Muff |
| 2013/0111242 A1 | 5/2013 | Heller |
| 2013/0117543 A1 | 5/2013 | Venkataramanan et al. |
| 2013/0138925 A1 | 5/2013 | Hickey |
| 2013/0145128 A1 | 6/2013 | Schardt |
| 2013/0148506 A1 | 6/2013 | Lea |
| 2013/0151215 A1 | 6/2013 | Mustapha |
| 2013/0159668 A1 | 6/2013 | Muff |
| 2013/0159669 A1 | 6/2013 | Comparan |
| 2013/0159674 A1 | 6/2013 | Muff |
| 2013/0159675 A1 | 6/2013 | Muff |
| 2013/0159676 A1 | 6/2013 | Muff |
| 2013/0159944 A1 | 6/2013 | Uno et al. |
| 2013/0160026 A1 | 6/2013 | Kuesel |
| 2013/0160114 A1 | 6/2013 | Greenwood |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0185542 A1 | 7/2013 | Mejdrich |
| 2013/0191572 A1 | 7/2013 | Nooney et al. |
| 2013/0191600 A1 | 7/2013 | Kuesel |
| 2013/0191649 A1 | 7/2013 | Muff |
| 2013/0191651 A1 | 7/2013 | Muff |
| 2013/0191824 A1 | 7/2013 | Muff |
| 2013/0191825 A1 | 7/2013 | Muff |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0294458 A1 | 11/2013 | Yamaguchi et al. |
| 2013/0305207 A1 | 11/2013 | Hsieh |
| 2013/0311819 A1 | 11/2013 | Ishii |
| 2013/0326458 A1 | 12/2013 | Kazda et al. |
| 2014/0013293 A1 | 1/2014 | Hsu |
| 2014/0068132 A1 | 3/2014 | Philip et al. |
| 2014/0068134 A1 | 3/2014 | Philip et al. |
| 2014/0082237 A1 | 3/2014 | Wertheimer |
| 2014/0086260 A1 | 3/2014 | Dai |
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0126572 A1 | 5/2014 | Hutton |
| 2014/0133307 A1* | 5/2014 | Yoshida ............... H04L 12/403 370/235 |
| 2014/0143557 A1 | 5/2014 | Kuesel |
| 2014/0143558 A1 | 5/2014 | Kuesel |
| 2014/0149720 A1 | 5/2014 | Muff |
| 2014/0156929 A1* | 6/2014 | Falsafi ............... G06F 12/0813 711/122 |
| 2014/0164465 A1 | 6/2014 | Muff |
| 2014/0164704 A1 | 6/2014 | Kuesel |
| 2014/0164732 A1 | 6/2014 | Muff |
| 2014/0164734 A1 | 6/2014 | Muff |
| 2014/0211622 A1 | 7/2014 | Kumar et al. |
| 2014/0229709 A1 | 8/2014 | Kuesel |
| 2014/0229712 A1 | 8/2014 | Muff |
| 2014/0229713 A1 | 8/2014 | Muff |
| 2014/0229714 A1 | 8/2014 | Muff |
| 2014/0229720 A1 | 8/2014 | Hickey |
| 2014/0230077 A1 | 8/2014 | Muff |
| 2014/0232188 A1 | 8/2014 | Cheriyan |
| 2014/0241376 A1 | 8/2014 | Balkan |
| 2014/0254388 A1 | 9/2014 | Kumar et al. |
| 2014/0281243 A1 | 9/2014 | Shalf |
| 2014/0281402 A1 | 9/2014 | Comparan |
| 2014/0307590 A1 | 10/2014 | Dobbelaere |
| 2014/0359641 A1 | 12/2014 | Clark |
| 2014/0376569 A1 | 12/2014 | Philip |
| 2015/0020078 A1 | 1/2015 | Kuesel |
| 2015/0026435 A1 | 1/2015 | Muff |
| 2015/0026494 A1 | 1/2015 | Bainbridge |
| 2015/0026500 A1 | 1/2015 | Muff |
| 2015/0032988 A1 | 1/2015 | Muff |
| 2015/0032999 A1 | 1/2015 | Muff |
| 2015/0043575 A1 | 2/2015 | Kumar et al. |
| 2015/0081941 A1 | 3/2015 | Brown |
| 2015/0103822 A1 | 4/2015 | Gianchandani |
| 2015/0109024 A1 | 4/2015 | Abdelfattah et al. |
| 2015/0159330 A1 | 6/2015 | Weisman et al. |
| 2015/0178435 A1 | 6/2015 | Kumar |
| 2015/0331831 A1 | 11/2015 | Solihin |
| 2015/0348600 A1 | 12/2015 | Bhatia |
| 2015/0381707 A1 | 12/2015 | How |
| 2016/0182393 A1* | 6/2016 | Chen ................... H04L 47/625 370/412 |
| 2016/0182396 A1* | 6/2016 | Kaul ................... H04L 47/724 370/356 |
| 2017/0061053 A1 | 3/2017 | Kumar et al. |
| 2017/0063625 A1 | 3/2017 | Philip et al. |
| 2017/0063697 A1 | 3/2017 | Kumar |
| 2018/0219746 A1 | 8/2018 | Bainbridge et al. |
| 2018/0219747 A1 | 8/2018 | Bainbridge et al. |

FOREIGN PATENT DOCUMENTS

| | | |
|---|---|---|
| JP | 6060316 B2 | 1/2017 |
| JP | 6093867 B2 | 2/2017 |
| KR | 10-2013-0033898 A1 | 4/2013 |
| KR | 101652490 | 8/2016 |
| KR | 101707655 | 2/2017 |
| WO | 2010074872 A1 | 7/2010 |
| WO | 2013063484 A1 | 5/2013 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

(56) References Cited

OTHER PUBLICATIONS

Gindin, R., et al., NoC-Based FPGA: Architecture and Routing, Proceedings of the First International Symposium on Networks-on-Chip (NOCS'07), May 2007, pp. 253-262.
Grot, B., Preemptive Virtual Clock: A Flexible, Efficient, and Cost-Effective QOS Scheme for Networks-on-Chip, Micro '09, Dec. 16, 2009, 12 pgs.
Grot, B., Kilo-NOC: A Heterogeneous Network-on-Chip Architecture for Scalability and Service Guarantees, ISCA 11, Jun. 4-8, 2011, 12 pgs.
Grot, B., Topology-Aware Quality-of-Service Support in Highly Integrated Chip Multiprocessors, 6th Annual Workshop on the Interaction between Operating Systems and Computer Architecture, Jun. 2006, 11 pgs.
Hestness, J., et al., Netrace: Dependency-Tracking for Efficient Network-on-Chip Experimentation, The University of Texas at Austin, Dept. of Computer Science, May 2011, 20 pgs.
Jiang, N., et al., Performance Implications of Age-Based Allocations in On-Chip Networks, CVA MEMO 129, May 24, 2011, 21 pgs.
Lee, J.W., et al., Globally-Synchronized Frames for Guaranteed Quality-of-Service in On-Chip Networks, 35th IEEE/ACM International Symposium on Computer Architecture (ISCA), Jun. 2008, 12 pgs.
Lee, M. M., et al., Approximating Age-Based Arbitration in On-Chip Networks, PACT '10, Sep. 11-15, 2010, 2 pgs.
Li, B. et al., CoQoS: Coordinating QoS-Aware Shared Resources in NoC-based SoCs, J. Parallel Distrib. Comput., 71 (5), May 2011, 14 pgs.
Lin, S., et al., Scalable Connection-Based Flow Control Scheme for Application-Specific Network-on-Chip, The Journal of China Universities of Posts and Telecommunications, Dec. 2011, 18(6), pp. 98-105.
Bolotin, Evgency, et al., "QNoC: QoS Architecture and Design Process for Network on Chip" 2004, 24 pages, Journal of Systems Architecture 50 (2004) 105-128 Elsevier.
Holsmark, Shashi Kumar Rickard, et al., "HiRA: A Methodology for Deadlock Free Routing in Hierarchical Networks on Chip", 10 pages, (978-1-4244-4143-3/09 2009 IEEE).
Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.
Rajesh BV, Shivaputra, "NOC: Design and Implementation of Hardware Network Interface With Improved Communication Reliability", 7 pages, International Journal of VLSI and Embedded Systems, IJIVES (vol. 04, Article 06116; Jun. 2013).
Yang, J., et al., Homogeneous NoC-based FPGA: The Foundation for Virtual FPGA, 10th IEEE International Conference on Computer and Information Technology (CIT 2010), Jun. 2010, pp. 62-67.
Zaman, Aanam, "Formal Verification of Circuit-Switched Network on Chip (NoC) Architectures using SPIN", Oosman Hasan, IEEE © 2014, 8 pages.
Benini, Luca, et al., "Networks on Chips: A New SoC Paradigm", IEEE Computers, SOC Designs, pp. 70-78, Copyright 2002 IEEE.
Sethuraman, Ranga Vemuri Balasubramanian, "optiMap: A Tool for Automated Generation of NoC Architecture Using Multi-Port Routers for FPGAs", IEEE, pp. 1-6, 2006.
International Search Report and Written Opinion for PCT/US2014/060745, dated Jan. 21, 2015, 10 pgs.
International Search Report and Written Opinion for PCT/US2014/060879, dated Jan. 21, 2015, 10 pgs.
International Search Report and Written Opinion for PCT/US2014/060892, dated Jan. 27, 2015, 10 pgs.
International Search Report and Written Opinion for PCT/US2014/060886, dated Jan. 26, 2015, 10 pgs.
International Search Report and Written Opinion for PCT/US2013/064140, dated Jan. 22, 2014, 9 pgs.
International Search Report and Written Opinion for PCT/US2014/012003, dated Mar. 26, 2014, 9 pgs.
International Search Report and Written Opinion for PCT/US2014/012012, dated May 14, 2014, 9 pgs.
International Search Report and Written Opinion for PCT/US2014/023625, dated Jul. 10, 2014, 9 pgs.
International Preliminary Report on Patentability for International Application No. PCT/US2013/064140, dated Apr. 14, 2015, 5 pages.
Office Action for Korean Patent Application No. 10-2016-7019093 dated Sep. 8, 2016, 3 pages plus 1 page English translation. KIPO, Korea.
Notice of Allowance for for Korean Patent Application No. 10-2016-7019093 dated Sep. 8, 2016, 4 pages. KIPO, Korea.
International Search Report and Written Opinion for PCT/US2014/037902, dated Sep. 30, 2014, 14 pgs.
Office Action for Japanese Patent Application No. 2015-535898 dated Oct. 25, 2016, 2 pages English, 2 pages untranslated copy. Japan Patent Office.
Notice of Grant for Japanese Patent Application No. 2015-535898 dated Jan. 17, 2017, 3 pages, untranslated. Japan Patent Office.
International Search Report and Written Opinion for PCT/US2014/048190, dated Nov. 28, 2014, 11 pgs.
Office Action for Japanese Patent Application No. 2016-516030 dated Aug. 30, 2016, 2 pages, Japan Patent Office.
Decision to Grant for Japanese Patent Application No. 2016-516030 dated Nov. 22, 2016, 6 pages, untranslated, Japan Patent Office.
Office Action received for U.S. Appl. No. 15/903,724, dated Jan. 24, 2019, 6 pages.
Office Action received for U.S. Appl. No. 15/904,225, dated Jan. 18, 2019, 6 pages.

\* cited by examiner

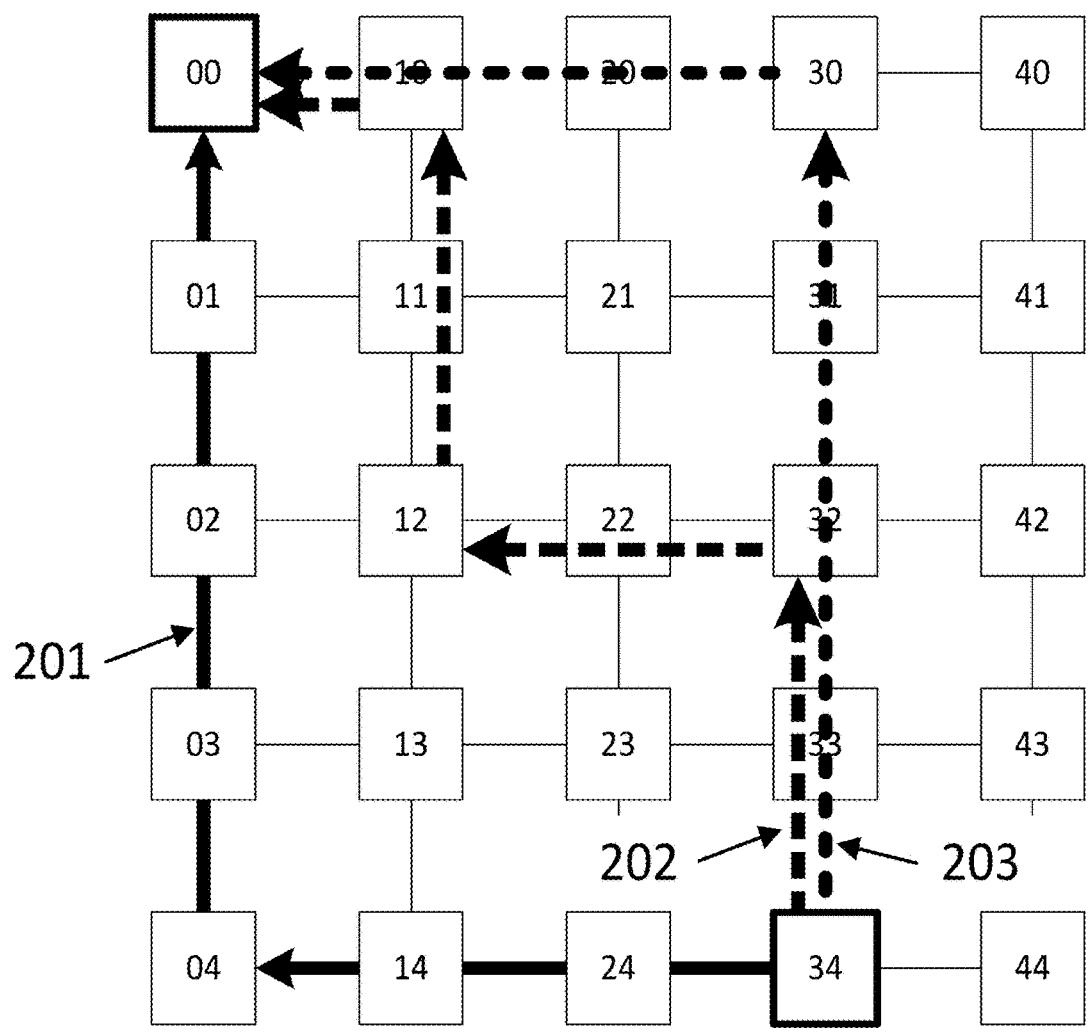

Traffic profile 1: A <--> B; A <--> G;
Traffic profile 2: A <--> C; B <--> D; D <--> G; E <--> F;
Traffic profile 3: G <--> C;

COST MANAGEMENT AGAINST REQUIREMENTS FOR THE GENERATION OF A NOC

CROSS REFERENCE TO RELATED APPLICATIONS

This regular U.S. patent application is based on and claims the benefit of priority under 35 U.S.C. 119 from provisional U.S. patent application No. 62/453,431, filed on Feb. 1, 2017, the entire disclosure of which is incorporated by reference herein.

BACKGROUND

Technical Field

Methods and example implementations described herein are directed to interconnect architecture, and more specifically, to generation of a Network on Chip (NoC) based on requirements and cost management.

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Taurus (as shown in FIG. 1(c)) are examples of topologies in the related art. Mesh and Taurus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits).

The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303, or bridge, may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication which thereby reduces the global average latency, as well as reduce the number of router nodes and links over which the higher bandwidth of this communication must be provisioned.

Moving two hosts closer together may make certain other hosts far apart since all hosts must fit into the 2D planar NoC topology without overlapping with each other. Thus, various tradeoffs must be made and the hosts must be placed after examining the pair-wise bandwidth and latency requirements between all hosts so that certain global cost and performance metrics is optimized. The cost and performance metrics can be, for example, average structural latency between all communicating hosts in number of router hops, or sum of bandwidth between all pair of hosts and the distance between them in number of hops, or some combination of these two. This optimization problem is known to be NP-hard and heuristic based approaches are often used. The hosts in a system may vary in shape and sizes with respect to each other, which puts additional complexity in placing them in a 2D planar NoC topology, packing them optimally while leaving little whitespaces, and avoiding overlapping hosts.

The optimization approaches introduced so far to determine the channel capacity, routes, host positions, etc., are useful when the exact traffic profile is known in advance at the NoC design time. If the precise traffic profile is not known at the design time, and the traffic profile changes during the NoC operation based on the SoC application's requirements, then the NoC design must allow these adjustments. For the NoC to allow these changes, the NoC must be designed so that it has knowledge of the changes that may occur in the traffic profile in a given system and ensure that any combination of allowable traffic profiles are supported by the NoC hardware architecture.

SUMMARY

In related art implementations, when a customer requests for a NoC to be generated, the customer may provide its own NoC specification, the performance requirements or performance functions, and the cost functions that the customer is interested in. The NoC may be generated by a design house and presented to the customer that meets their minimum performance requirements. However, in such implementations, the customer may determine that they are willing to incur more costs if performance can be improved by a particular margin (e.g. 10%), or they may determine that the cost is too high and want to determine if it is possible to generate a NoC that meets their performance requirements within a lower cost range. The design house thereby has to redesign and regenerate the NoC for the customer, which is a time and resource wasting process. There is a need for a method to present multiple NoCs that meet the minimum requirements as well as possible desired requirements, as well as a method for presenting to such customers possible generatable NoCs and the cost versus performance space of possible NoCs that may meet their absolute minimum and may also meet their margin requirements.

Aspects of the present disclosure include a method involving processing a NoC specification for a plurality of performance requirements of a NoC; generating a plurality of NoCs, each of the plurality of NoCs meeting a first subset of the plurality of performance requirements; for each of the plurality of NoCs, presenting a difference between an actual performance of the each of the plurality of NoCs and each performance requirement of a second subset of the plurality of performance requirements and one or more costs for each of the plurality of NoCs.

Aspects of the present disclosure further include a non-transitory computer readable medium, storing instructions for executing a process. The instructions include processing a NoC specification for a plurality of performance requirements of a NoC; generating a plurality of NoCs, each of the plurality of NoCs meeting a first subset of the plurality of performance requirements; and for each of the plurality of NoCs, presenting a difference between an actual performance of the each of the plurality of NoCs and each performance requirement of a second subset of the plurality of performance requirements and one or more costs for each of the plurality of NoCs.

Aspects of the present disclosure further include a method for generating a NoC, which can include processing a NoC specification for a plurality of performance requirements of a NoC; generating a plurality of NoCs, each of the plurality of NoCs meeting a first subset of the plurality of performance requirements; and for each of the plurality of NoCs, presenting a difference between an actual performance of the each of the plurality of NoCs and each performance requirement of a second subset of the plurality of performance requirements and one or more costs for each of the plurality of NoCs, and selecting one of the plurality of NoCs for generation or manufacture.

Through such example implementations, multiple NoCs do not have to be repeatedly generated in response to customer feedback, thereby saving time and resources in generating a NoC. The customer can also view the performance versus cost gradient and can determine realistic NoCs that can be generated along the gradient or that exceed the gradient, and select the NoC for generation.

BRIEF DESCRIPTION OF THE DRAWINGS

FIG. 2(*b*) illustrates three different routes between a source and destination nodes.

FIG. 3(*b*) illustrates the related art bridge logic between host and multiple NoC layers.

DETAILED DESCRIPTION

Figure 1A:
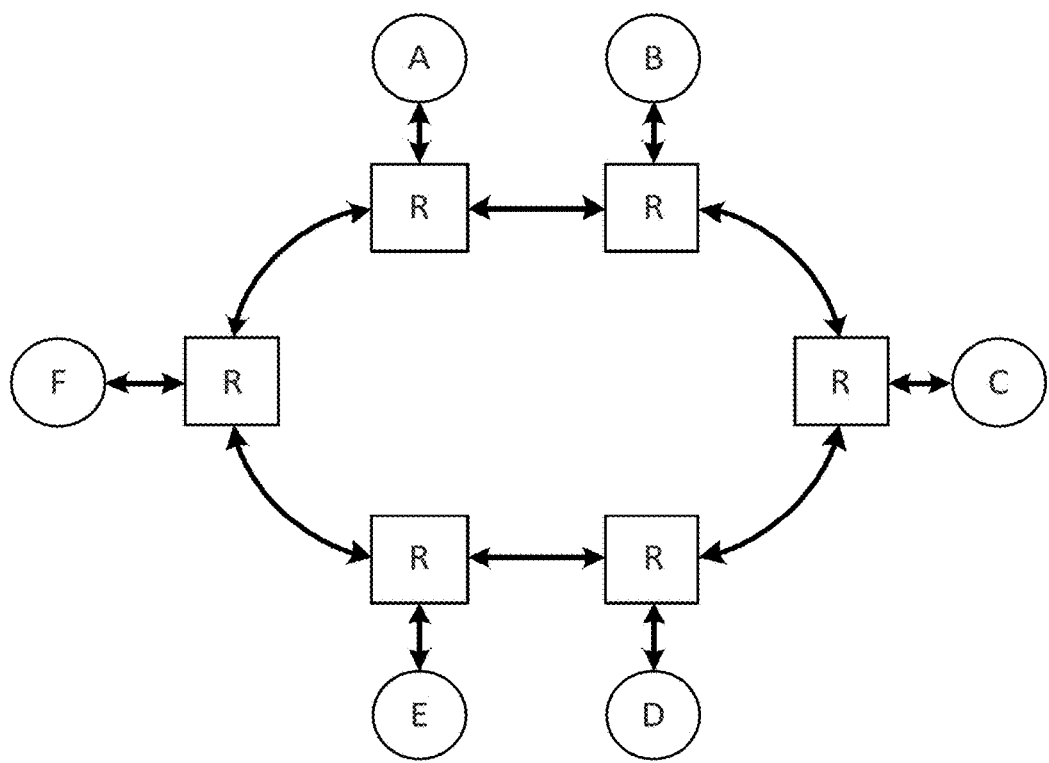
FIGS. 1(*a*), 1(*b*) 1(*c*) and 1(*d*) illustrate examples of Bidirectional ring, 2D Mesh, 2D Taurus, and 3D Mesh NoC Topologies.
Figure 1B:
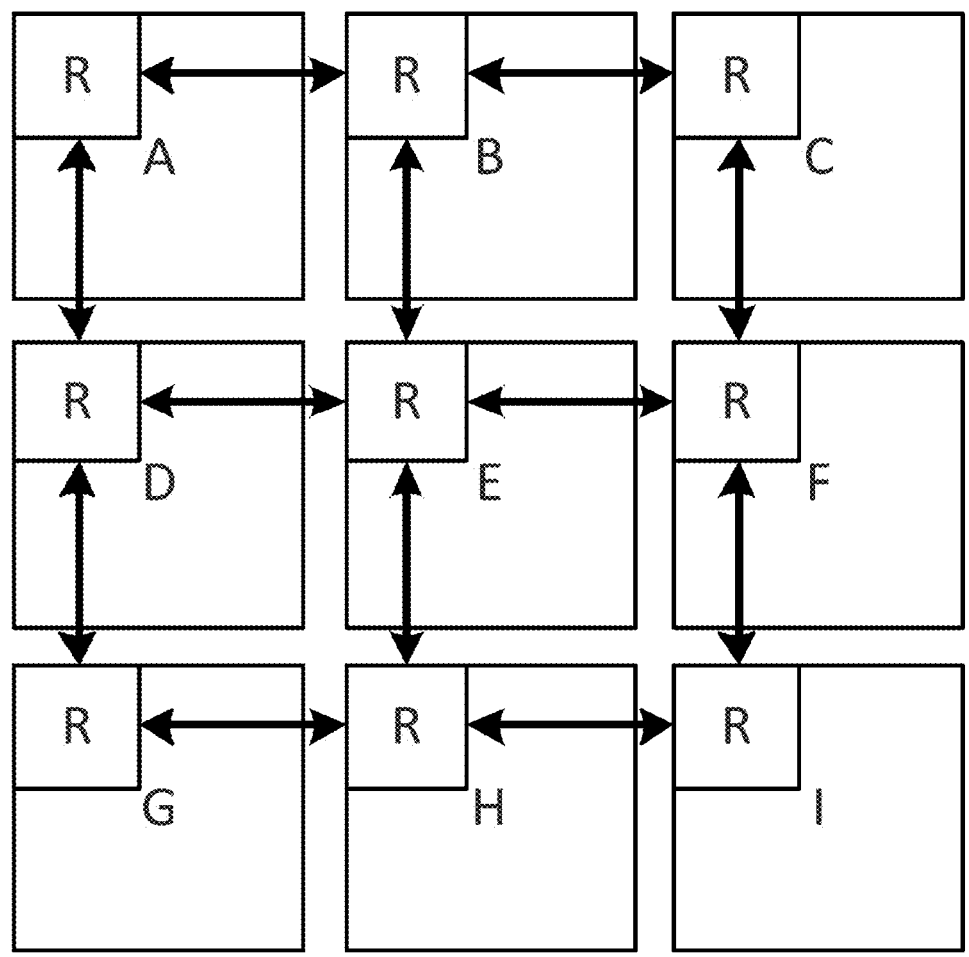
Figure 1C:
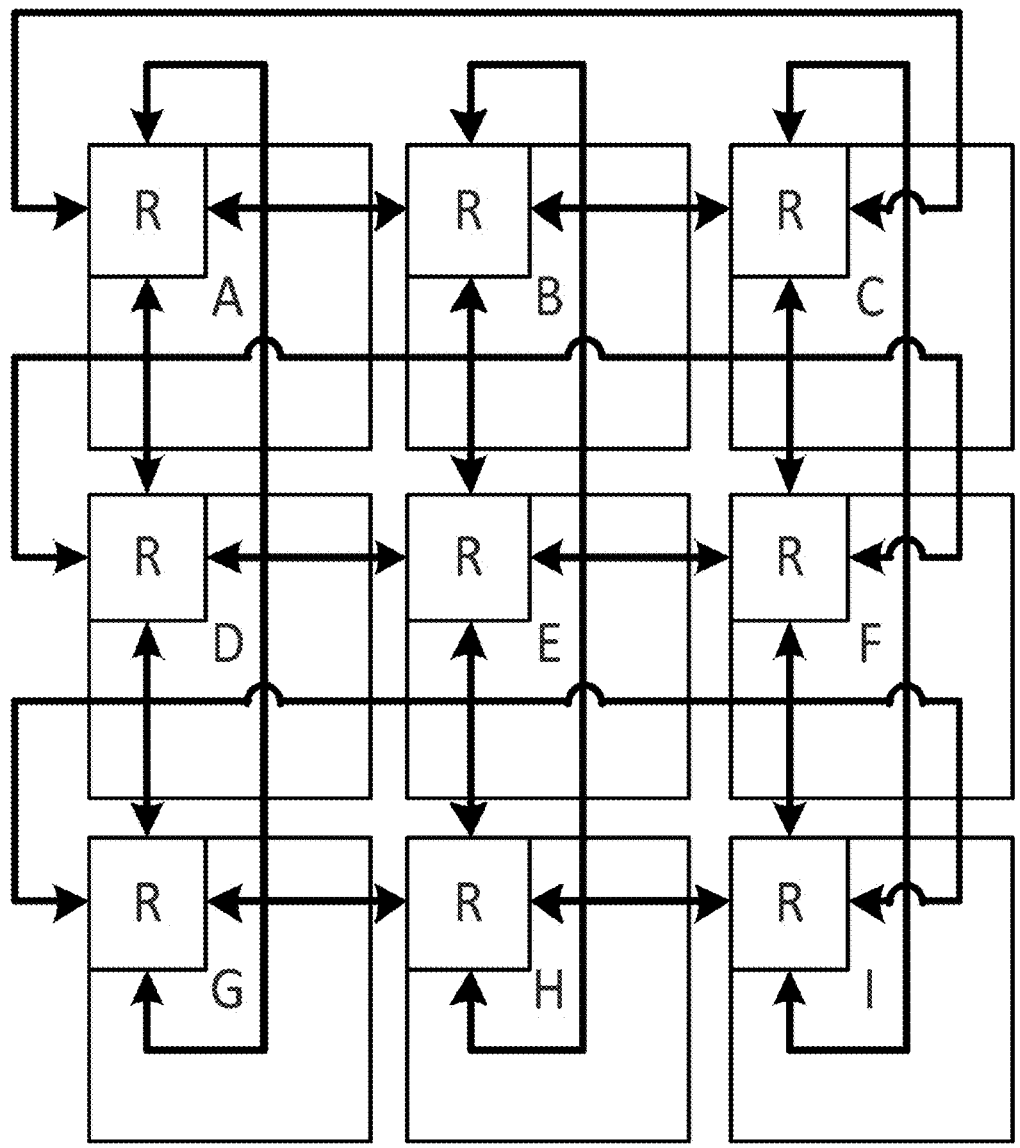
Figure 1D:
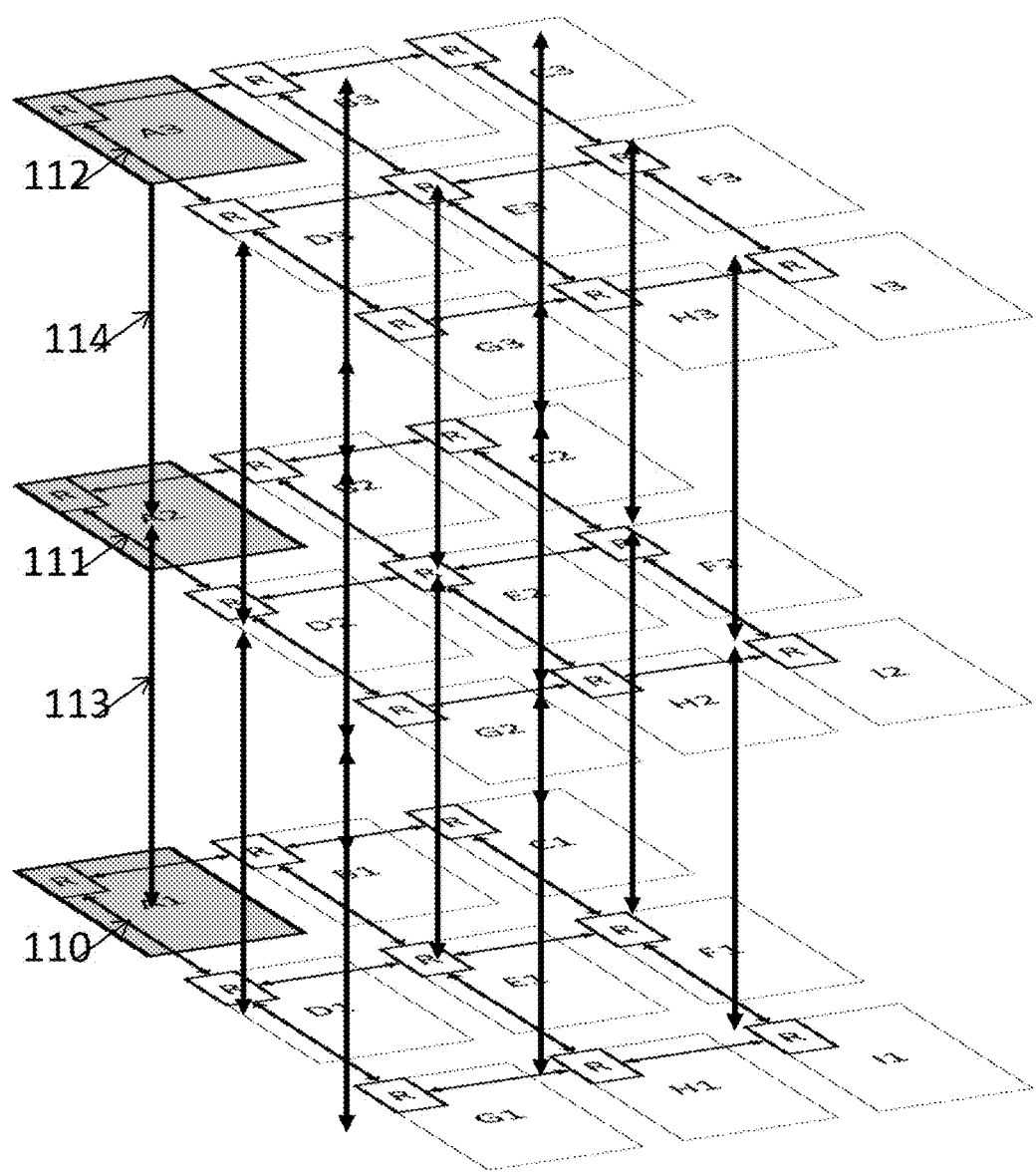
Figure 2A:
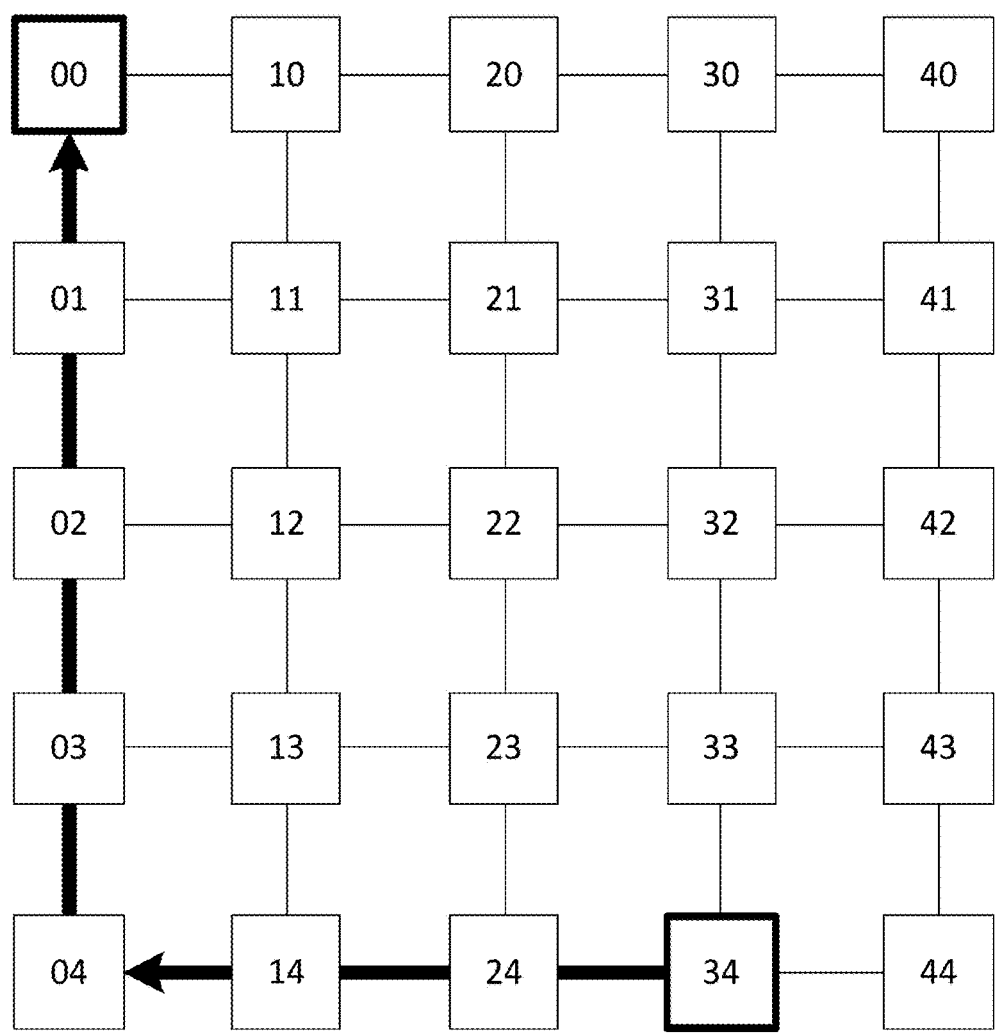
FIG. 2(*a*) illustrates an example of XY routing in a related art two dimensional mesh.
Figure 3A:
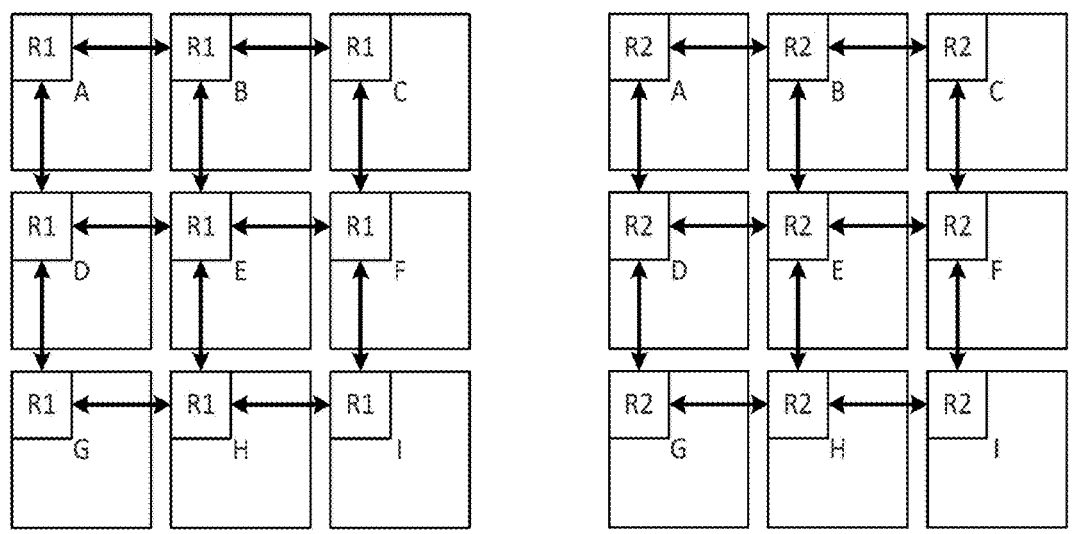
FIG. 3(*a*) illustrates an example of a related art two layer NoC interconnect.
Figure 3B:
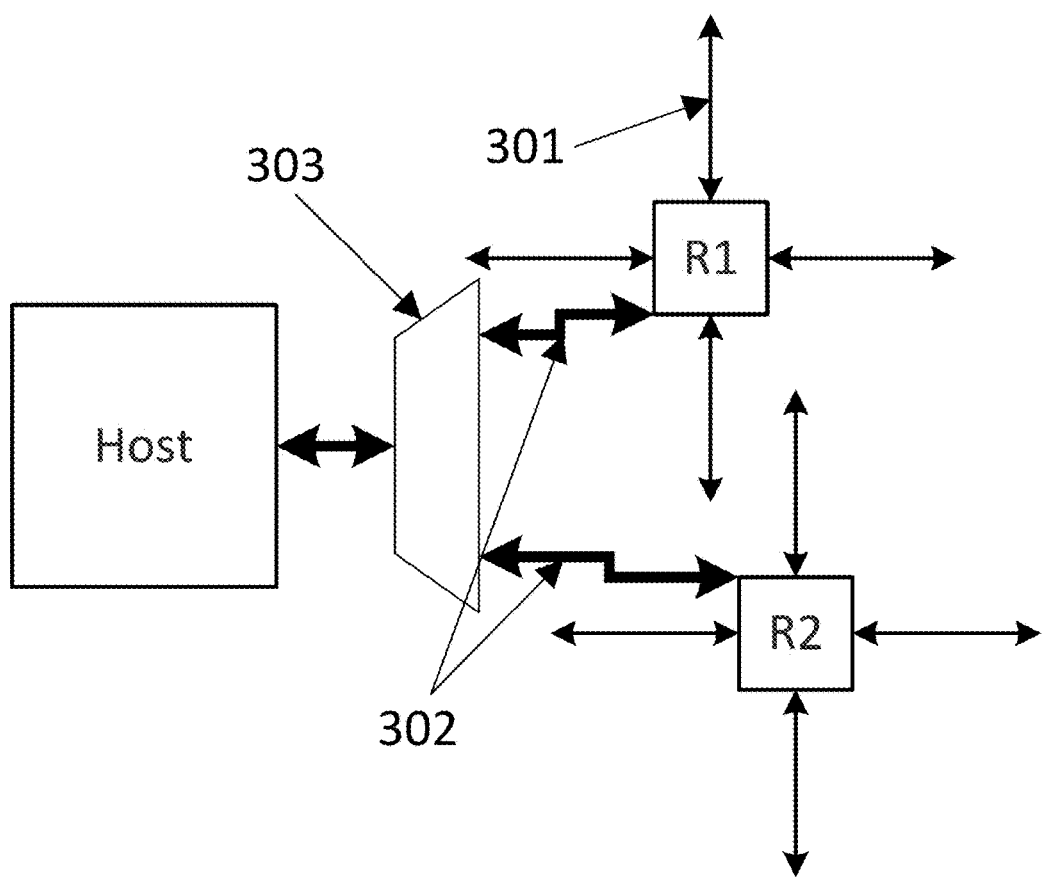

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In example implementations, a NoC interconnect is generated from a specification by utilizing design tools. The specification can contain constraints such as bandwidth/Quality of Service (QoS)/latency attributes that is to be met by the NoC, and can be in various software formats depending on the design tools utilized. Once the NoC is generated through the use of design tools on the specification to meet the specification requirements, the physical architecture can be implemented either by manufacturing a chip layout to facilitate the NoC or by generation of a register transfer level (RTL) for execution on a chip to emulate the generated NoC, depending on the desired implementation. Specifications may be in common power format (CPF), Unified Power Format (UPF), or others according to the desired specification. Specifications can be in the form of traffic specifications indicating the traffic, bandwidth requirements, latency requirements, interconnections and so on depending on the desired implementation. Specifications can also be in the form of power specifications to define power domains, voltage domains, clock domains, and so on, depending on the desired implementation.

A distributed NoC interconnect connects various components in a system on chip with each other using multiple routers and point to point links between the routers. The traffic profile of a SoC includes the transactions between various components in the SoC and their properties (e.g., Quality of Service (QoS), priority, bandwidth and latency requirements, transaction sizes, etc.). The traffic profile information may be used to determine how various transactions will be routed in the NoC topology, and accordingly provision the link capacities, virtual channels and router nodes of the NoC. Accurate knowledge of the traffic profile can lead to an optimized NoC hardware with minimal overprovisioning in terms of link wires, virtual channel buffers and additional router nodes. A variety of SoCs today are designed to run a number of different applications; the resulting NoC traffic profile therefore may differ based on how and in what market segments the SoC is deployed, and what applications are supported. Supporting a variety of traffic profiles offers several challenges in the NoC design and optimization. Even if multiple traffic profiles are supported functionally, the traffic profile observed in a particular setting may be different from the set of profiles for which the NoC is optimized, leading to sub-optimal power consumption and NoC performance.

Example implementations described herein are directed to solutions for 2-D, 2.5-D and 3-D NoC interconnects. The example implementations may involve various aspects, such as: 1) designing a NoC to one or more traffic profiles of a traffic specification by mapping their transactions to NoC and allocating routes, virtual channels, and layers; 2) supporting hardware reconfigurability in the NoC to be able to optimize the NoC performance for a given subset of traffic profiles present in a SoC; 3) using example implementations herein to process each flow to optimize the mapping of the flows to the NoC hardware; 5) based on the determined flows, generating the reconfiguration information to be loaded into the NoC hardware; and 6) finally transmitting the reconfiguration information to the NoC in a format that can be loaded into NoC reconfiguration hardware.

Example implementations are directed to the utilization of machine learning based algorithms. In the related art, a wide range of machine learning based algorithms have been applied to image or pattern recognition, such as the recognition of obstacles or traffic signs of other cars, or the categorization of elements based on a specific training. In view of the advancement in power computations, machine learning has become more applicable for the generation of NoCs and for the mapping of traffic flows of NoCs.

In example implementations, the NoC is designed with agents, bridges, and the traffic specification, wherein a mapping algorithm attempts to map the traffic flows and determine if the flows should be included in the NoC generation process or not. Flows are processed in an incremental way. In example implementations, the specification is also processed to determine the characteristics of the NoC to be generated, the characteristics of the flow (e.g. number of hops, bandwidth requirements, type of flow such as request/response, etc.), flow mapping decision strategy (e.g., limit on number of new virtual channels to be constructed, using of existing VCs, yx/xy mapping, other routing types), and desired strategy to be used for how the flows are to be mapped to the network.

Figure 4:
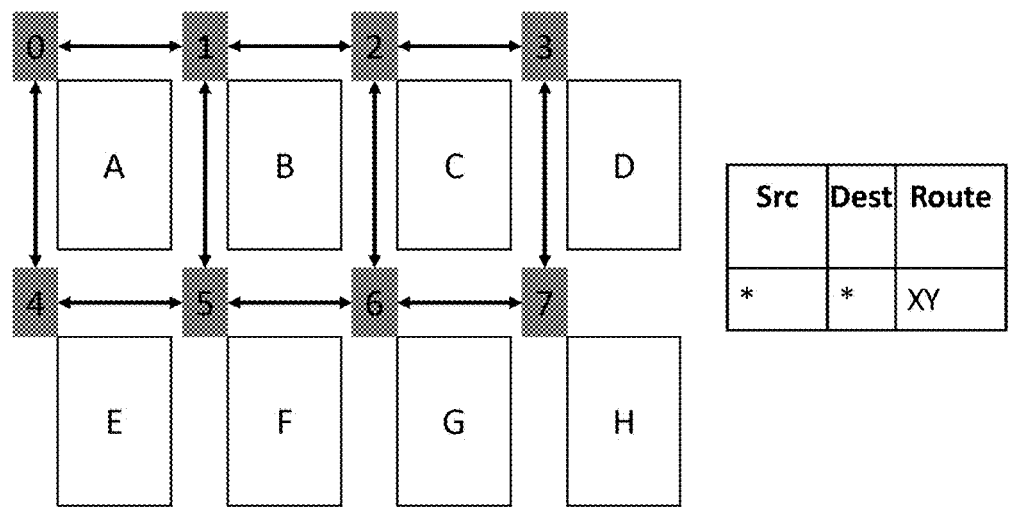
FIG. 4 illustrates a 4×2 mesh NoC mapping three traffic profiles using XY routing.

FIG. 4 illustrates an example of a traffic specification including multiple traffic profiles mapped to the NoC interconnect and mapping the transactions. Here there are three traffic profiles that need to be supported in a NoC interconnect connecting eight hosts, A, B, C, D, E, F, G, H. The inter-component communications of the three traffic profiles are as follows:

Traffic Profile 1: A<->B; A<->G;
Traffic Profile 2: A<->C; B<->D; D<->G; E<->F;
Traffic Profile 3: G<->C;

The example NoC of FIG. 4 is a 4×2 mesh topology. To support the three traffic profiles, routes and virtual channels are allocated for each transaction of all of the traffic profiles. In this case, a single NoC layer is allocated (for additional bandwidth and channels, more NoC layers may be allocated). A number of schemes can be used for allocation of NoC channels and routes and multiple layers, some of which are described in U.S. application Ser. Nos. 13/599,559, 13/745,684, and 13/752,226, hereby incorporated by reference for all purposes in their entirety. In this example, XY routes are used for all transactions, and the links and router nodes along the routes of all transactions in the three traffic profiles are allocated as shown in FIG. 4. Virtual channels allocated at various links between routers are omitted for clarity.

In related art implementations, one possible problem with the provided performance requirements is that, as such performance requirements may be provided by third parties or users, it may be uncertain as to whether a performance requirement is an absolute requirement or a desired requirement. In an example, a user incorporating a desired performance requirement in a NoC generation system may end up generating NoCs that have unacceptable costs, or lopsided costs when a significantly better NoC cost wise could have been generated in exchange for a slightly less restricted performance requirement. Thus, the generated NoCs may not meet the true requirements of the third parties or users.

Example implementations are directed to capturing input requirements and forming metrics that can be utilized to determine which of the possible generated NoCs can be further optimized. In example implementations, traffic flows are mapped, whereupon a NoC is selected and traffic flows are implemented with incremental refinement until the characteristics of the traffic flows are maximized.

Figure 5:
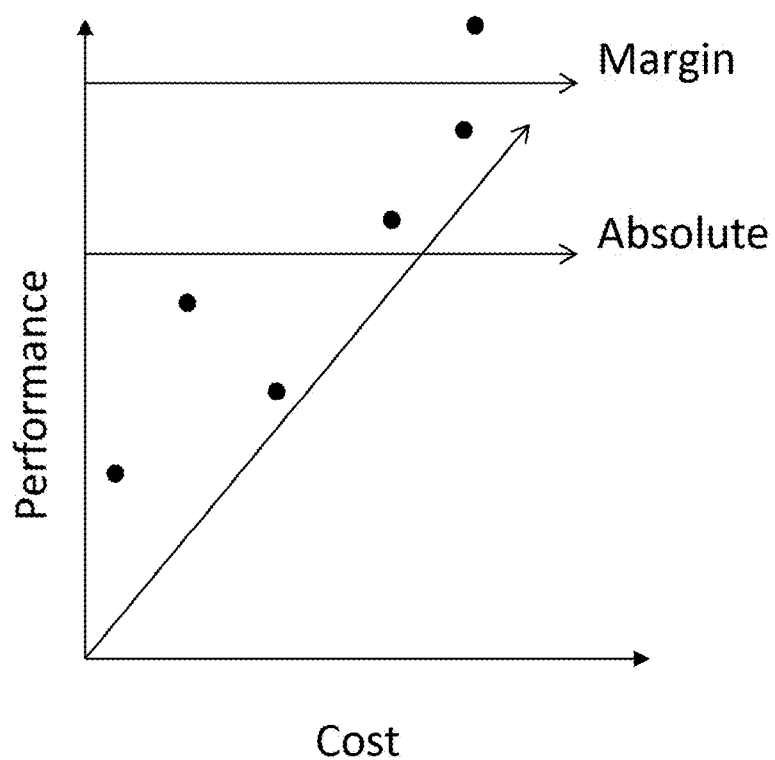
FIG. 5 illustrates an example user display showing a range of possible generated NoCs over a metric, in accordance with an example implementation.

FIG. 5 illustrates an example user display showing a range of possible generated NoCs over a metric, in accordance with an example implementation. In one metric example, the cost metrics can involve some cost function incorporating the area of the NoC and the power consumption, which can be plotted against performance metrics which involves another cost function involving latency, bandwidth and QoS. As illustrated in FIG. 5, an interface is provided which illustrates generated NoCs (represented as dots in the graph), and the performance as determined from a performance metric function, in comparison with the cost of the generated NoC as defined the cost function.

In example implementations as illustrated in FIG. 5, the band lines can indicate whether a certain requirement can tolerate something lower (margin) or if it is an absolute value that must be met (absolute). When presented with the possible generated NoCs, there is a performance divided by area slope, and a visualization that indicates the generated NoCs that meet the minimum versus being better than a desired margin. Example implementations are directed to facilitating the visualization and providing methods to capturing input requirements to facilitate flexibility in selecting the flows that are truly desired for a NoC. Through the provision of the slope, the NoC designer can thereby determine the tradeoffs between performance and cost over the desired performance and cost functions.

In example implementations, once such visualizations can be provided, NoC generation systems can be utilized to prioritize not only trading off one flow versus the other, but also prioritizing and potentially conducting multiple passes through the optimization process for refinement. For example, in a first pass, the generated NoCs can include all of the NoCs that can meet the absolute minimum requirements, which can then be further optimized to determine the desired extra margin and the costs associated with such optimizations. Such example implementations are in contrast to related art implementations which can only provide a single-stage process.

Figure 6:
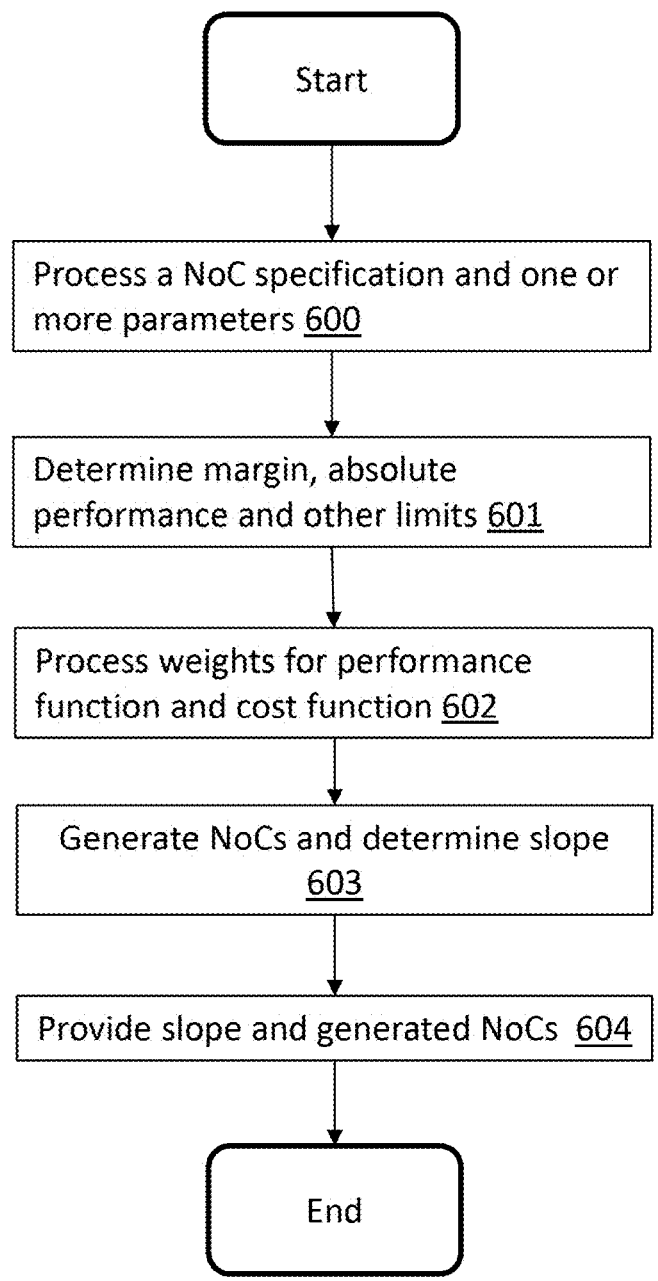
FIG. 6 illustrates an example flow diagram, in accordance with an example implementation.

FIG. 6 illustrates an example flow, in accordance with an example implementation. At 600, a NoC specification and one or more parameters are processed. At 601, based on the processing of the NoC specification and the one or more parameters, the margin, absolute performance requirements and other limits (e.g. power limits, QoS requirement, bandwidth requirements, etc.) are determined. At 602, the weights for the performance function and the cost function are processed. At 603, the NoCs are generated and associated with values from the performance function and the cost function, whereupon the slope for the performance versus cost is determined across the generated NoCs. At 604, the slope and generated NoCs are provided as illustrated in FIG. 5.

In example implementations, the slope can be modified by a desired gradient and shifted according to the desired implementation. Such gradients can include a cost gradient and performance gradient that is shifted to reflect the desired cost to pay for the NoC generation or performance. In example implementations, the traffic specification can also indicate a desired margin and a cost gradient that the user is willing to pay to effect the desired margin.

In example implementations, additional modifiers can be provided for each traffic flow. For example, the input specification can include various flags to indicate a flow as latency sensitive or latency insensitive.

Such example implementations provide the ability to distinguish between the desired flows versus flows that are not as important, as well as determining that when a flow mapping algorithm is utilized, which flow mapping algorithms provide NoCs meeting the desired performance versus cost tradeoff. Once the visualization is provided, a customer can thereby generate the desired NoC from the plurality of NoCs determined by the machine learning algorithm, or can cause the machine learning algorithm to execute more generations within the desired absolute and desired margin space.

Figure 7:
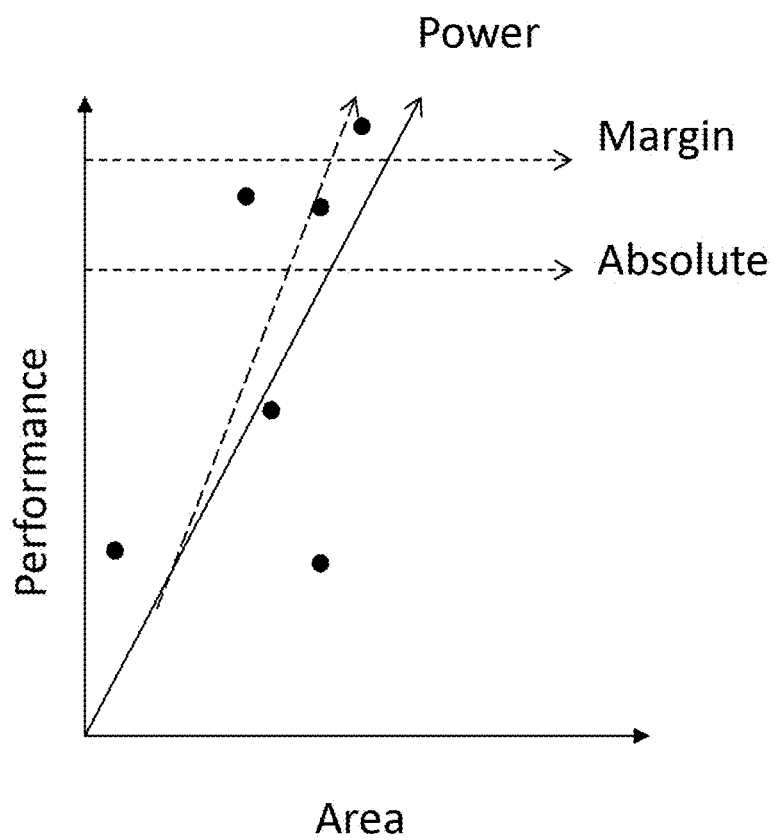
FIG. 7 illustrates another example user display, in accordance with an example implementation.

FIG. 7 illustrates an example 3D visualization interface, in accordance with an example implementation. In example implementations, the cost function can also be divided into the desired parameters. Example parameters can include power consumption and area consumption, although other parameters are possible depending on the desired implementation. Such visualizations can be useful, for example, when a flow is implemented with a wire to trade dynamic power for leakage power. In such an implementation, an area gradient and a power gradient may also be utilized to modify the slope for filtering out the possible generated NoCs to meet the desired requirements. In such example implementations, the performance tradeoff in comparison to area and power can thereby be provided.

In example implementations as described in FIG. 7, there can also be a global power budget for NoC generation. The interface can include a slider knob for applying gradients for global power budget available versus area, which can adjust preferences for power or area. Further, for a generated NoC, an interface can be provided so that power or area restrictions can be specified for particular traffic flows. In this way, performance can be compared to two or more cost functions.

Further, in example implementations, the performance function can be specified based on latency and bandwidth. The interface as described in FIG. 7 can include a visualization that splits performance into latency and bandwidth. In such example implementations, traffic flows can be granulized into different types. For example, traffic flows can be classified as central processing unit (CPU) type traffic where communications are latency sensitive and can be flagged as such. Another type of flow can include a graphics processing unit (GPU) type communication where bandwidth is more important than latency. Another type of flow can include the video display type of flows, where average throughput over a period of time is important. To reflect the type of information needed to facilitate such flows, parameters such as latency, latency variation, bandwidth, jitter and so on can be utilized in singular or in combination to provide the performance function, and then expanded in the interface as described in FIG. 7 should the designer prefer a particular parameter to be optimized.

Figure 8:
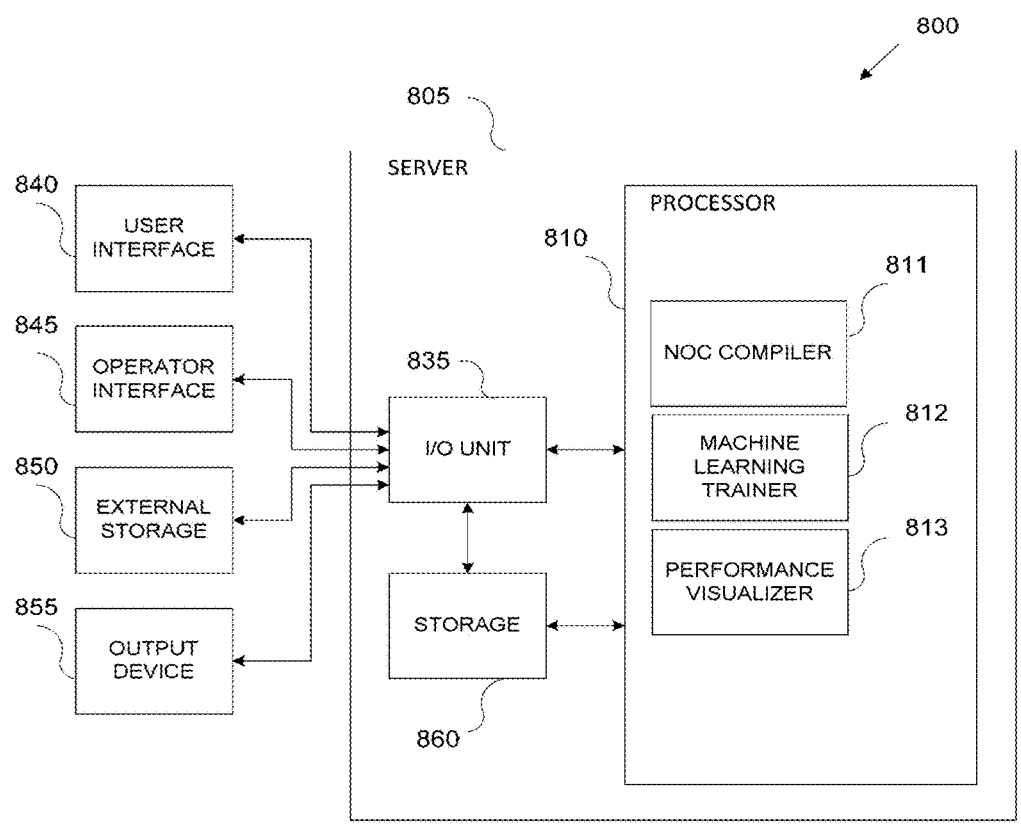
FIG. 8 illustrates a computer/server block diagram upon which the example implementations described herein may be implemented.

FIG. 8 illustrates an example computer system 800 on which example implementations may be implemented. The computer system 800 includes a server 805 which may involve an I/O unit 835, storage 860, and a processor 810 operable to execute one or more units as known to one of skill in the art. The term "computer-readable medium" as used herein refers to any medium that participates in providing instructions to processor 810 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 840 and operator interfaces 845 which may utilize input devices such as a keyboard, mouse, touch device, or verbal command.

The server 805 may also be connected to an external storage 850, which can contain removable storage such as a portable hard drive, optical media (CD or DVD), disk media or any other medium from which a computer can read executable code. The server may also be connected an output device 855, such as a display to output data and other information to a user, as well as request additional information from a user. The connections from the server 805 to the user interface 840, the operator interface 845, the external storage 850, and the output device 855 may via wireless protocols, such as the 802.11 standards, Bluetooth® or cellular protocols, or via physical transmission media, such as cables or fiber optics. The output device 855 may therefore further act as an input device for interacting with a user.

The processor 810 may execute one or more modules. The NoC compiler 811 is configured to generate NoCs in the form of a layout or an RTL. The Machine learning Trainer 812 can be configured to train a machine learning algorithm to select a generated NoC for construction based on a performance/cost tradeoff. The performance visualizer 813 can be configured to provide visualizations as shown, for example, in FIG. 5 and FIG. 7.

Processor 810 can be configured to process a NoC specification for a plurality of performance requirements of a NoC; generate a plurality of NoCs, each of the plurality of NoCs meeting a first subset of the plurality of performance requirements; for each of the plurality of NoCs, present a difference between an actual performance of the each of the plurality of NoCs and each performance requirement of a second subset of the plurality of performance requirements and one or more costs for each of the plurality of NoCs as illustrated in FIG. 5 and FIG. 7. Upon receiving a selection, processor 810 can generate the NoC from the plurality of NoCs for the customer. The plurality of performance requirements can involve bandwidth requirements and latency requirements for a plurality of sets of traffic of the NoC specification. The plurality of performance requirements can involve performance requirements of selected one or more subsets of traffic of the NoC specification. The plurality of performance requirements can also involve multiple SoC/NoC use profiles. Further, the one or more costs comprises at least one of area, power consumption, and wiring congestion.

The presenting the difference and the one or more costs comprises providing a visualization for the plurality of NoCs based on a function incorporating performance and cost as illustrated in FIGS. 5 and 7. As illustrated in FIGS. 5 and 7, the function can be a gradient of performance and the one or more costs. The presenting the difference can involve providing a graphical display (e.g. scatterplot, histogram) comparing performance versus the one or more costs.

In addition, processors 810 can utilize machine learning algorithms configured to generate the NoCs based on the specified performance and cost/area functions. The machine learning based algorithm can also be configured to select a NoC from the plurality of NoCs for generation based on performance versus the one or more costs for the customer. Such machine learning based algorithms can be configured to select a NoC based on a computation of a gradient between the performance and the costs, and another function for NoCs having the same gradient.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method, comprising:
processing a Network on Chip (NoC) specification for a plurality of performance requirements of a NoC;
generating a plurality of NoCs, each of the plurality of NoCs meeting a first subset of the plurality of performance requirements;
for each of the plurality of NoCs, presenting a difference between an actual performance of the each of the plurality of NoCs and each performance requirement of a second subset of the plurality of performance requirements and one or more costs for each of the plurality of NoCs.

2. The method of claim 1, wherein the plurality of performance requirements comprises bandwidth requirements and latency requirements for a plurality of sets of traffic of the NoC specification.

3. The method of claim 1, wherein the plurality of performance requirements comprises performance requirements of selected one or more subsets of traffic of the NoC specification.

4. The method of claim 1, wherein the plurality of performance requirements comprises multiple System on Chip (SoC) or NoC use profiles.

5. The method of claim 1, wherein the one or more costs comprises at least one of area, power consumption, and wiring congestion.

6. The method of claim 1, wherein the presenting the difference and the one or more costs comprises providing a visualization for the plurality of NoCs based on a function incorporating performance and cost.

7. The method of claim 6, wherein the function is a gradient of performance and the one or more costs.

8. The method of claim 1, further comprising utilizing a machine learning based method configured to select a NoC from the plurality of NoCs for generation based on performance versus the one or more costs.

9. The method of claim 1, wherein the machine learning based method is configured to select a NoC based on a computation of a gradient between the performance and the costs, and another function for NoCs having the same gradient.

10. The method of claim 1, wherein the presenting the difference comprises providing a graphical display comparing performance versus the one or more costs.

11. A non-transitory computer readable medium, storing instructions for executing a process, the instructions comprising:
processing a NoC specification for a plurality of performance requirements of a NoC;
generating a plurality of NoCs, each of the plurality of NoCs meeting a first subset of the plurality of performance requirements;
for each of the plurality of NoCs, presenting a difference between an actual performance of the each of the plurality of NoCs and each performance requirement of a second subset of the plurality of performance requirements and one or more costs for each of the plurality of NoCs.

12. The non-transitory computer readable medium of claim 11, wherein the plurality of performance requirements comprises bandwidth requirements and latency requirements for a plurality of sets of traffic of the NoC specification.

13. The non-transitory computer readable medium of claim 11, wherein the plurality of performance requirements comprises performance requirements of selected one or more subsets of traffic of the NoC specification.

14. The non-transitory computer readable medium of claim 11, wherein the plurality of performance requirements comprises multiple SoC/NoC use profiles.

15. The non-transitory computer readable medium of claim 11, wherein the one or more costs comprises at least one of area, power consumption, and wiring congestion.

16. The non-transitory computer readable medium of claim 11, wherein the presenting the difference and the one or more costs comprises providing a visualization for the plurality of NoCs based on a function incorporating performance and cost.

17. The non-transitory computer readable medium of claim 16, wherein the function is a gradient of performance and the one or more costs.

18. The non-transitory computer readable medium of claim 11, further comprising utilizing a machine learning based method configured to select a NoC from the plurality of NoCs for generation based on performance versus the one or more costs.

19. The non-transitory computer readable medium of claim 11, wherein the machine learning based method is configured to select a NoC based on a computation of a gradient between the performance and the costs, and another function for NoCs having the same gradient.

20. The non-transitory computer readable medium of claim 11, wherein the presenting the difference comprises providing a graphical display comparing performance versus the one or more costs.

* * * * *